H. W. CHENEY.
SYSTEM OF ELECTRICAL DISTRIBUTION.
APPLICATION FILED OCT. 6, 1909.
1,005,937.
Patented Oct. 17, 1911.
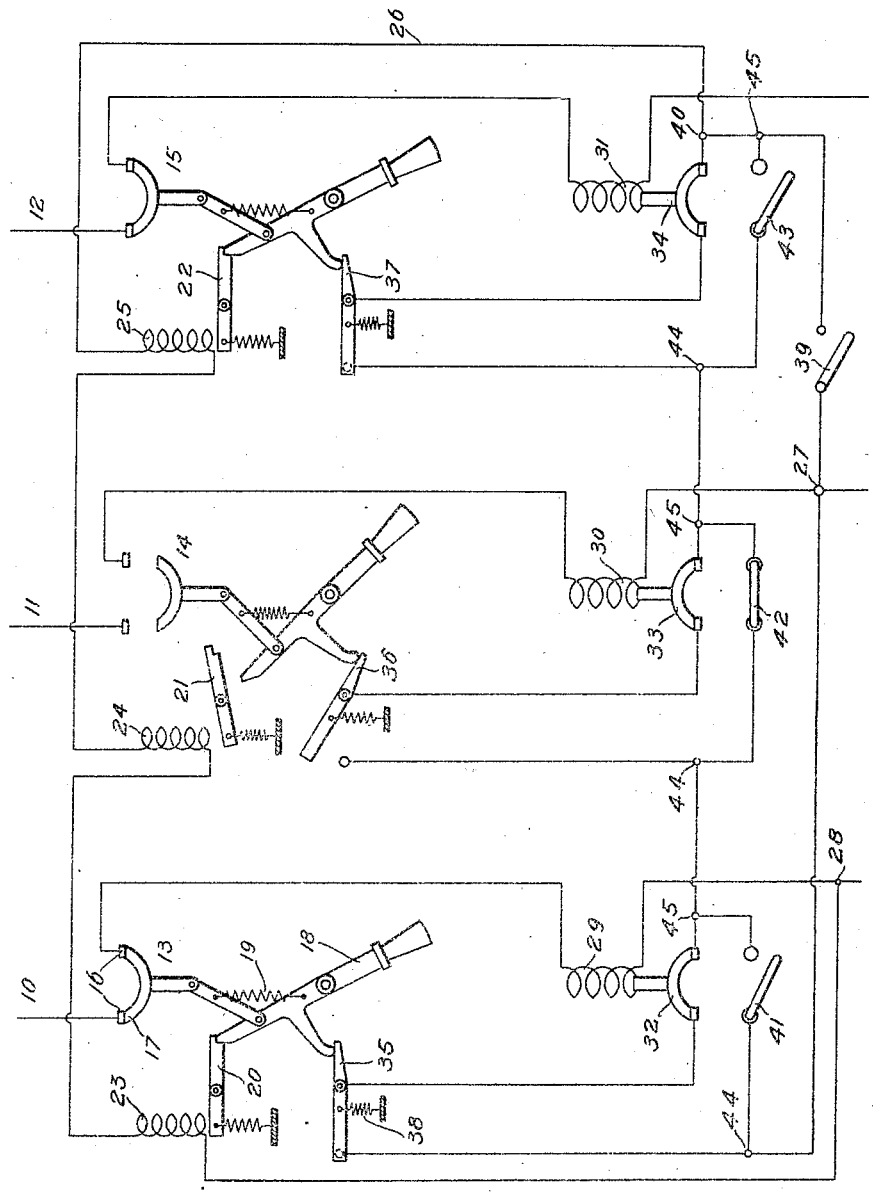
Witnesses
Rob. E. Sell.
Chas. L. Byron
Inventor
Herbert W. Cheney
By Chas. E. Lord
Attorney

UNITED STATES PATENT OFFICE.

HERBERT W. CHENEY, OF MILWAUKEE, WISCONSIN, ASSIGNOR TO ALLIS-CHALMERS COMPANY, A CORPORATION OF NEW JERSEY.

SYSTEM OF ELECTRICAL DISTRIBUTION.

1,005,937.  Specification of Letters Patent.  Patented Oct. 17, 1911.

Application filed October 6, 1909. Serial No. 521,368.

*To all whom it may concern:*

Be it known that I, HERBERT W. CHENEY, a citizen of the United States, residing at Milwaukee, in the county of Milwaukee and State of Wisconsin, have invented certain new and useful Improvements in Systems of Electrical Distribution, of which the following is a full, clear, and exact specification.

This invention relates to systems of current distribution and particularly to means for operating a plurality of circuit breakers in the conductors of the system.

The object of the invention is the provision of means whereby a number of circuit breakers in the conductors of a distributing system may be closed independently, and tripped simultaneously on the occurrence of predetermined line conditions, such as an overload in any conductor of the system and on the occurrence of no voltage or a predetermined drop in the voltage between two conductors of the system.

In carrying out my invention I provide a system of distribution consisting of two or more conductors having circuit breakers which are retained in closed position by normally energized coils in a tripping circuit preferably connected across two of the conductors of the system, the tripping circuit being designed to be opened so as to effect the simultaneous release or opening of all the circuit breakers by the operation of any one of a number of switches each controlled by a series overload coil in one of the conductors of the system or by the partial or entire deënergization of the tripping coils on the occurrence of a predetermined drop in voltage between the conductors across which the tripping circuit is connected.

In order that the circuit breakers may be closed independently, I have provided a switch which is connected to the tripping circuit in shunt to the switches which are controlled by the series overload coils, so that when this switch is temporarily closed it renders the overload switches ineffective for opening the tripping circuit.

As another feature of my invention I provide means whereby one or more of the conductors of the system and the corresponding circuit breakers may be rendered inoperative without affecting the operation of the other conductors and circuit breakers, and this I accomplish by means of a plurality of auxiliary switches each connected in shunt to one of the overload switches in the tripping circuit, so that when one of the auxiliary switches is closed one of the main circuit breakers may be open without affecting the tripping circuit.

My invention may be further briefly summarized as consisting in certain novel arrangements and combinations of parts which will be described in the specification and set forth in the appended claims.

Referring to the accompanying figure of the drawing, which shows diagrammatically a system of distribution equipped with the features of my invention, it will be seen that I have shown a sysem of distribution consisting, in this case, of three conductors 10, 11 and 12 which may be conductors of three-phase or of a multiple conductor direct current system. The conductors are provided respectively with automatic circuit breakers 13, 14 and 15 which may be of any suitable construction but are here shown somewhat conventionally as having a pair of stationary contacts 16 adapted to be bridged by a movable contact 17 operatively connected to a handle 18 and designed to be opened by a coil spring 19. The circuit breakers are adapted to be held in closed position respectively by means of pivoted spring actuated latches 20, 21 and 22 which are held in certain positions and are restrained against movement to trip the circuit breakers by means of normally energized tripping coils 23, 24 and 25 in a tripping circuit, which may be designated as a whole by the reference character 26, and which, in this case, is supplied with current by conductors 10 and 11, being connected across and to these conductors at 27 and 28.

In order that all the circuit breakers may be simultaneously tripped on the occurrence of an overload in any one of the main conductors 10, 11 and 12, the latter are provided respectively with series overload coils 29, 30 and 31 adapted to open respectively, on overload, normally closed overload switches 32, 33 and 34 in the tripping circuit 26. In order that the tripping circuit may be caused to remain open as long as one or more of the circuit breakers are open I provide adjacent each circuit breaker and in the tripping circuit a circuit opening switch, these three switches being designated respectively 35, 36 and 37, and each being designed to be opened when the corresponding circuit breaker is opened and to be closed when the circuit breaker is closed.

Thus it will be seen from the arrangement so far described that on the occurrence of an overload in any one of the main conductors, the tripping circuit will be opened by one or more of the overload switches 32, 33 and 34 and all the circuit breakers will be simultaneously opened, and on the failure of current in the tripping circuit or on the occurrence of a predetermined drop in the voltage between the conductors 10 and 11, the tripping coils 23, 24 and 25 will be partially or wholly deënergized causing the circuit breakers to be simultaneously opened.

In order that the circuit breakers may be closed independently I provide a normally open hand switch 39 the terminals of which are connected to the tripping circuit in shunt to the overload switches 32, 33 and 34 and to the auxiliary switches 35, 36 and 37, the connections of the switch 39 to the tripping circuit being at the points 27 and 40. It will be seen that if the switch 39 is closed the overload switches and the auxiliary switches adjacent the circuit breakers are rendered ineffective for opening the tripping circuit and consequently as soon as this switch is closed the tripping coils are energized regardless of the positions of the circuit breakers, which can, therefore, be closed independently. When the switch 39 is open, the tripping circuit will be opened when any one of the overload switches is opened.

To render any one of the main conductors and the corresponding circuit breaker inoperative so that one or more of the circuit breakers may be left in open position while the others are closed, I provide small normally open hand switches 41, 42 and 43 each connected to the tripping circuit in shunt to the overload switch 32, 33 or 34 and to the auxiliary circuit opening switch 35, 36 or 37 of each circuit breaker, each of these normally open switches 41, 42 and 43 being connected to the tripping circuit at points designated 44 and 45. Thus when any one of these switches 41, 42 or 43 is closed the corresponding overload switch and the corresponding small auxiliary circuit opening switch 35, 36 or 37 operated by any one of the circuit breakers is rendered ineffective for opening the tripping circuit and consequently the corresponding circuit breaker may be left in open position without interfering with the operation of the remaining conductors and corresponding circuit breakers.

I do not desire to be confined to the exact combinations and arrangements shown, but aim in my claims to cover all modifications which do not involve a departure from the spirit and scope of my invention.

What I claim as new and desire to secure by Letters Patent is:—

1. In combination, in a system of distribution, a plurality of electric conductors each provided with a circuit breaker, a tripping circuit having a number of normally energized coils each serving to hold one of the circuit breakers in closed position, a plurality of overload switches in the tripping circuit, and a normally open switch having terminals connected to the tripping circuit in shunt to each of said overload switches.

2. In combination, in a system of distribution, a plurality of electric conductors, each provided with a circuit breaker, a tripping circuit having a number of normally energized coils each serving to hold one of the circuit breakers in closed position, a plurality of overload switches in the tripping circuit each having an overload coil in one of the main conductors, a normally open switch having terminals connected to the tripping circuit in shunt to each of said overload switches, and a normally open switch having terminals connected to the tripping circuit in shunt to all of said overload switches.

3. In a system of distribution, a plurality of electric conductors each provided with a circuit breaker, a tripping circuit having a plurality of normally energized coils each serving to maintain one of said circuit breakers in closed position, a plurality of overload switches in said tripping circuit and each having an overload operating coil in one of the conductors of the system, and a plurality of additional switches in the tripping circuit one for each circuit breaker and adapted to be opened when the circuit breaker is opened and to be closed when the circuit breaker is closed.

4. In combination, in a system of distribution, a plurality of electric conductors, each provided with a circuit breaker, a tripping circuit having a plurality of normally energized coils each serving to maintain one of the circuit breakers in closed position, a plurality of overload switches in the tripping circuit each having an overload operating coil in one of the conductors of the system, a plurality of additional switches in the tripping circuit each adapted to be opened when one of the circuit breakers is opened and adapted to be closed when the circuit breaker is closed, and a normally open switch having terminals connected to the tripping circuit in shunt to one of said last named switches and to one of the overload switches.

5. In combination, in a system of distribution, a plurality of electric conductors, each provided with a circuit breaker, a tripping circuit having a plurality of normally energized coils each serving to maintain one of the circuit breakers in closed position, a plurality of overload switches in the tripping circuit each having an overload operating coil in one of the conductors of the system, a plurality of additional switches in the tripping circuit each adapted to be opened when one of the circuit breakers is opened and adapted to be closed when the circuit breaker is closed, and a normally open switch having terminals connected in shunt to all the overload switches and to all said additional switches in the tripping circuit.

Milwaukee, Wis., Sept. 10, 1909.

In testimony whereof I affix my signature, in the presence of two witnesses.

HERBERT W. CHENEY.

Witnesses:
 CHAS. L. BYRON,
 ROB. E. STOLL.